United States Patent
He et al.

(10) Patent No.: US 11,405,313 B2
(45) Date of Patent: Aug. 2, 2022

(54) SIMULATION DESIGN METHOD FOR BAY LAYER DEVICES OF SMART SUBSTATION

(71) Applicant: GUANGDONG UNIVERSITY OF TECHNOLOGY, Guangzhou (CN)

(72) Inventors: Ruiwen He, Guangdong (CN); Jialiang Lu, Guangdong (CN); Yiyin Wang, Guangdong (CN); Yiyu Lin, Guangdong (CN)

(73) Assignee: GUANGDONG UNIVERSITY OF TECHNOLOGY, Guangzhou (CN)

(*) Notice: Subject to any disclaimer, the term of this patent is extended or adjusted under 35 U.S.C. 154(b) by 0 days.

(21) Appl. No.: 17/198,275

(22) Filed: Mar. 11, 2021

(65) Prior Publication Data

US 2022/0158939 A1 May 19, 2022

(30) Foreign Application Priority Data

Jul. 27, 2020 (CN) .......................... 202010731150.5

(51) Int. Cl.
| | |
|---|---|
| H04L 45/00 | (2022.01) |
| H02J 13/00 | (2006.01) |
| H04L 43/10 | (2022.01) |
| H04L 47/31 | (2022.01) |

(52) U.S. Cl.
CPC ........ H04L 45/66 (2013.01); H02J 13/00006 (2020.01); H04L 43/10 (2013.01); H04L 47/31 (2013.01)

(58) Field of Classification Search
None
See application file for complete search history.

(56) References Cited

U.S. PATENT DOCUMENTS

| | | | | |
|---|---|---|---|---|
| 10,303,127 B2* | 5/2019 | Mazur | ............... | H02J 13/0013 |
| 10,338,544 B2* | 7/2019 | Brodbeck | ............. | G05B 15/02 |
| 2009/0006611 A1 | 1/2009 | Hong et al. | | |
| 2021/0341907 A1* | 11/2021 | Fadul | ............... | G05B 19/41885 |

FOREIGN PATENT DOCUMENTS

| | | |
|---|---|---|
| CN | 102565585 A | 7/2012 |
| CN | 106161139 A | 11/2016 |
| CN | 107342904 A | 11/2017 |
| CN | 111190357 A | 5/2020 |

\* cited by examiner

*Primary Examiner* — Xavier S Wong
(74) *Attorney, Agent, or Firm* — Andrew C. Cheng

(57) ABSTRACT

Disclosed is a simulation design method for bay layer devices of a smart substation. Application layer modules of two network structures store identity tags of each other's application layer modules respectively, so that a simulation model of the bay layer devices has ports of both network structures and can realize data sharing. The simulation model of the bay layer devices can process SV messages, GOOSE messages and MMS messages simultaneously. An interface layer is additionally configured between an application layer and a data link layer to allow data to be directly mapped to the data link layer from the application layer, so that received or transmitted messages contain actual electrical quantity information. The invention provides model establishment methods of two network structures, thus not only suitable for simulation of the bay layer devices, but also suitable for simulation of station control layer devices and process layer devices.

10 Claims, 7 Drawing Sheets

SIMULATION DESIGN METHOD FOR BAY LAYER DEVICES OF SMART SUBSTATION

FIELD

The invention relates to the field of smart substation simulation, and particularly relates to a simulation design method for bay layer devices of a smart substation.

BACKGROUND

The system architecture of smart substations typically consists of a station control layer, a bay layer and a process layer. A network between the station control layer and the bay layer is an MMS (manufacturing message specification) network, and a network between the bay layer and the process layer is a process layer network which includes an SV (sampled value) network and a GOOSE tripping network. The SV network is used to transmit analog quantities between merging units and protection and control devices in the bay layer, and the GOOSE network is mainly used for the tripping of process layer devices and the acquisition of on-off information of breakers, isolating switches and so on. In order to meet the real-time and reliability requirements for electrical information acquisition, specific service mapping involved in IEC61850 and DL/T860 standards directly map SV messages and GOOSE messages to a data link layer from an application layer. Based on this feature, when communication network simulation software is used for smart substation simulation, intelligent electronic devices in the process layer such as merging units and intelligent terminals are simulated by means of node models with a three-layer structure, that is, messages only pass through the application layer, the data link layer and a physical layer. The MMS network is used to exchange information between station control layer devices and bay layer devices, which mainly monitors and controls information of the bay layer devices, and has low real-time and reliability requirements. MMS messages are simulated by an OSI reference model with a seven-layer structure or a TCP/IP communication model with a four-layer structure.

To guarantee the reliable operation of smart substations, the MMS network and the process layer are physically separated at present, the SV network and the GOOSE network are physically separated, and multiple physical networks can be configured according to the voltage level to protect the transmission of analog quantities, GOOSE tripping and the acquisition of GOOSE on-off information against interference, reduce the network flow and improve the real-time performance and reliability. However, in that way, devices in the bay layer have to possess at least three Ethernet ports respectively for the MMS network, the SV network and the GOOSE network, so both a node model of a three-layer structure and a node model of a seven-layer structure are needed for simulation. If the node model of the three-layer structure and the node model of the seven-layer structure are used for simulation, these two models cannot share data, which makes it impossible to completely fulfill the functions of the intelligent electronic devices in the bay layer.

SUMMARY

Accordingly, the invention provides a simulation design method for bay layer devices of a smart substation to realize data exchange between a node model of a three-layer structure and a node model of a seven-layer structure, so as to overcome the defects of existing simulation methods.

The invention provides a simulation design method for bay layer devices of a smart substation, comprising:

Configuring application layer modules of a first network structure and an application layer module of a second network structure, and allocating an unique identity tag for each of the application layer modules, wherein the identity tag of the application layer module of the second network structure is stored in the application layer modules of the first network structure, and the identity tags of the application layer modules of the first network structure are stored in the application module layer of the second network structure;

Configuring s sub-modules for a data link layer, constructing an interface layer module between the application layer modules and the sub-modules of the data link layer, and setting, by the interface layer module, network structures to which the sub-modules of the data link layer belong; and Setting a plurality of states and execution logics of all modules of the first network structure and the second network structure respectively, and packaging all the modules into simulation elements according to transmission directions of data in the network structures.

Preferably, configuring the application layer modules of the first network structure comprises:

Configuring a message receiving sub-module and a message sending sub-module.

Preferably, when a GOOSE message is transmitted, the execution logic of the message sending sub-module of the first network structure includes:

When there is no need to trip, packaging a no-trip signal into a GOOSE heartbeat message in terms of an IEC61850 protocol standard, and sending the GOOSE heartbeat message to the interface layer module; or When the message receiving sub-module triggers a trip signal, packaging the trip signal into a GOOSE message in terms of the IEC61850 protocol standard, sending the GOOSE message to the interface layer module, and determining a sending time of a next GOOSE message according to a GOOSE message retransmission rule.

Preferably, when a message arrives in the second network structure, the execution logic of the message sending sub-module of the first network structure further includes:

Accessing the application layer module of the second network structure according to the identity tag of the application layer module of the second network structure to acquire required data, packaging the required data into a GOOSE message, and sending the GOOSE message to the interface layer module.

Preferably, the execution logic of the message receiving sub-module includes:

Receiving and analyzing an SV message and/or a GOOSE message, and updating statistics information of messages received and sent; or If a message received is neither the SV message nor the GOOSE message, destroying the message.

Preferably, configuring the application layer module of the second network structure comprises:

Configuring a root module and a plurality of execution sub-modules, wherein the execution sub-modules are used to transmit messages.

Preferably, when a message to be sent by bay layer devices belongs to the second network structure, the root module is triggered to construct the plurality of execution sub-modules, and the execution sub-modules access the application layer module of the first network structure according to the identity tag of the application layer module of the first network structure to acquire required data, which are then packaged into a message to be sent to the interface layer module.

Preferably, when a message to be transmitted by the bay layer devices belongs to the second network structure, the root module is triggered to construct a first execution sub-module, and when needing to manage multiple message session services, the first execution sub-module is triggered to establish a second execution sub-module and transmits operating parameter information to the second execution sub-module;

In case of a single message session service, the second execution sub-module is triggered to establish a third execution sub-module and transmits operating parameter information to the third execution sub-module;

The third execution sub-module accesses the application layer module of the first network structure according to the identity tag of the application layer module of the first network structure to acquire required data, which are then packaged into a message to be sent to the interface layer module.

Preferably, setting, by the interface layer module, the network structures to which the sub-modules of the data link layer belong, comprises:

Creating, after the s sub-modules of the data link layer are initialized, a chain table to record information of all the sub-modules, setting m sub-modules as data link layer sub-modules of the first network structure, and setting one sub-module as a data link layer sub-module of the second network structure, wherein s=m+1.

Preferably, the execution logic of the interface layer module includes:

Determining a network structure source of a message according to the identity tag of the application layer module in the message, and sending the message to the data link layer sub-module of the corresponding network structure.

Preferably, the execution logic of the interface layer module further includes:

Determining a network structure source of a message according to an MAC address in the message, and sending the message to the application layer module of the corresponding network structure.

By adoption of the above technical solution, the invention has the following beneficial effects:

According to the simulation design method for bay layer devices of a smart substation, application layer modules of two network structures store identity tags of each other respectively, so that a simulation model of the bay layer devices has ports of the two network structures and can realize data sharing. The simulation model of the bay layer devices obtained by implementing the invention can process SV messages, GOOSE messages and MMS messages simultaneously. The interface layer is additionally configured between the application layer and the data link layer to allow data to be directly mapped to the data link layer from the application layer, so that received or transmitted messages contain actual electrical quantity information. The invention provides model establishment methods of two network structures, thus being not only suitable for simulation of the bay layer devices, but also suitable for simulation of station control layer devices and process layer devices.

BRIEF DESCRIPTION OF THE DRAWINGS

To more clearly explain the technical solutions of the embodiments of the invention or the prior art, drawings required for the description of the embodiments of the invention or the prior art will be briefly introduced below. Obviously, the drawings in the following description are merely for some embodiments of the invention, and those of ordinary skill in the art can obtain other drawings according to the following ones without creative efforts.

DESCRIPTION OF THE EMBODIMENTS

The technical solutions of the embodiments of the invention will be clearly and completely described below in conjunction with the drawings of the embodiments. Obviously, the embodiments in the following description are merely part of but not all possible embodiments of the invention. All other embodiments obtained by those of ordinary skill in the art on the basis of the embodiments described herein without creative efforts should also fall within the protection scope of the invention.

Figure 1:
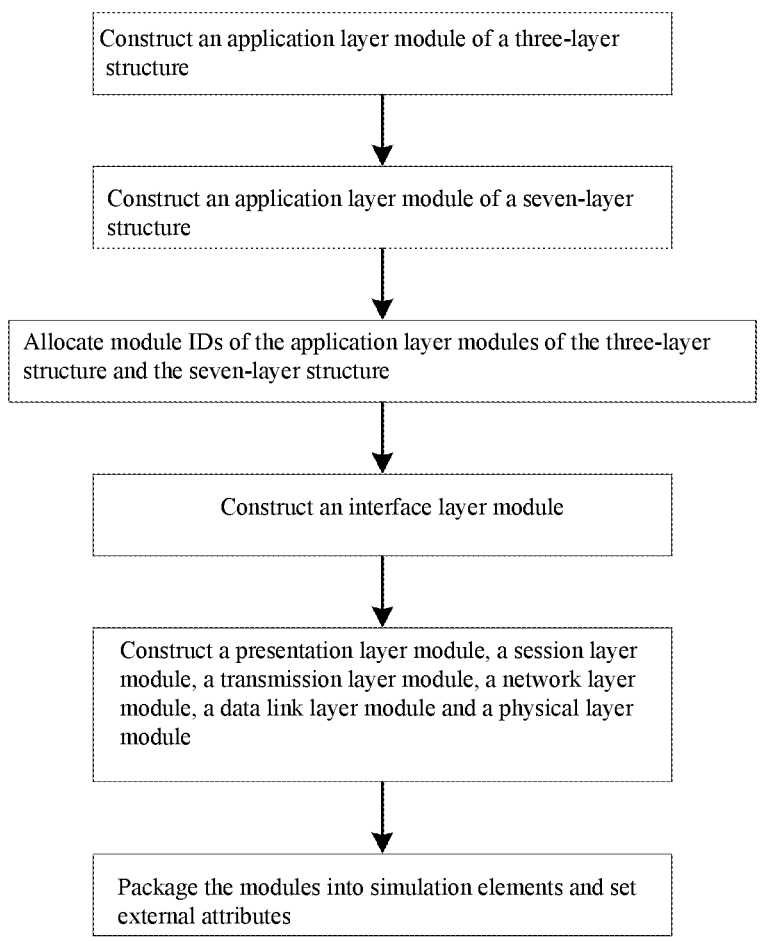
FIG. 1 is a flow chart for implementing a simulation design method for bay layer devices of a smart substation in one embodiment of the invention.

Referring to FIG. 1, this embodiment introduces a design method of simulation elements of bay layer devices of a smart substation. Considering that SV messages and GOOSE messages only pass through the application layer, the data link layer and the physical layer during communication, a network structure to which a node model belongs is referred to as a three-layer structure in this embodiment; an OSI reference model of a seven-layer structure is adopted for MMS messages, and a network structure to which a node model belongs is referred to as a seven-layer structure in this embodiment. The design method is explained below.

In constructing application layer modules, a space is reserved in a memory specifically for storing data, identity tags of the application layer modules are allocated in the module construction process, and the identity tag of each module is unique and corresponds to one memory address which is a memory space for storing data; each application layer module may store the identity tags of multiple other modules to realize an access to other application layer modules and can acquire the corresponding memory addresses of the memory spaces where data are stored after acquiring the identity tags of other modules, so as to have an access to the data in the memory spaces.

Unique module IDs are set for an application layer module of a seven-layer structure and an application layer module of a three-layer structure of bay layer devices to serve as identity tags of the modules. The ID of the application layer module of the seven-layer structure is stored in the application layer module of the three-layer structure, and meanwhile, the ID of the application layer module of the three-layer structure is stored in the application layer module of the seven-layer structure. The application layer module of the three-layer structure and the application layer module of the seven-layer structure grant access permissions to each other according to the reciprocal module IDs. The application layer module of the three-layer structure can access the application layer module of the seven-layer structure by means of the ID of the application layer module of the seven-layer structure, so as to acquire relevant information. Similarly, the application layer module of the seven-layer structure can access the application layer module of the three-layer structure by means of the ID of the application layer module of the three-layer structure, so as to acquire relevant information.

Step 1: the application layer module of the three-layer structure of the bay layer devices is constructed, wherein, in the construction process, the unique identity tag is allocated to the application layer module, and the identity tag of the application layer module of the seven-layer structure is stored in the application layer module of the three-layer structure.

(1) State Setting

States to be set at least include: "init", "wait", "message receive", and "message generate and send".

(2) Function Realization

The function is realized as follows: initialize relevant functions of this module and acquire relevant information required for running a process model; receive and analyze an SV message or a GOOSE message from process layer devices to obtain electrical quantity data or electrical on-off data therefrom; create a GOOSE heartbeat message or a GOOSE switching message according to the electrical on-off data, send the message to the interface layer, and update statistics information of data received and sent.

(3) Execution Logic

Simulation starts from the "init" state; when initialization is completed, enter the "wait" state; if an SV message or a GOOSE message arrives, trigger an interrupt to enter the "message receive" state to wait for a next flow interrupt; if a message, neither the SV message nor the GOOSE message, arrives, trigger an interrupt to destroy the message, and wait for a next flow interrupt;

As for the SV message, the bay layer devices can only receive the message from the process layer devices and cannot send the SV message to the process layer devices, so "message generate and send" of the application layer module of the three-layer structure of the bay layer devices is only for the GOOSE message, that is, when the GOOSE message is to be sent, a breaker trip command is packaged into the message to be sent to the interface layer; if an instruction in an MMS message from the station control layer needs to be transmitted to the process layer, the application layer module of the seven-layer structure will be accessed according to the ID thereof to acquire required data information, which is then packaged into the GOOSE message to be sent to the interface layer.

Step 2: the application layer module of the seven-layer structure of the bay layer devices is constructed, wherein, in the construction process, the unique identity tag of the application layer module is allocated, and the identity tag of the application layer module of the three-layer structure is stored in the application layer module of the seven-layer structure.

(1) State Setting

States to be set at least include: "init", "wait", "message receive", and "message generate and send".

(2) Function Realization

The function is realized as follows: initialize relevant functions of this module and acquire relevant information required for running a process model; receive and analyze an MMS message from station control layer devices to obtain data contents therefrom; acquire an operation instruction of an external power system and/or extract operation data from the application layer module of the three-layer structure to generate the MMS message in terms of the IEC61850 protocol standard, and send the MMS message to the station control layer according to a sending frequency; and update statistics information of data received and sent.

(3) Execution Logic

The execution logic is as follows: simulation starts from the "init" state; when initialization is completed, enter the "wait" state; if an MMS message arrives, trigger an interrupt to enter the "message receive" state, analyze the message, perform corresponding operation according to data contents, and then, wait for a next flow interrupt; acquire an operation instruction of an external power system, or access the application layer module of the three-layer structure according to the ID of the application layer module to acquire required data, which are then packaged into the MMS message to be sent to the interface layer module.

Step 3: an interface layer module of the bay layer devices is constructed.

(1) State Setting

States to be set at least includes: "init", "wait", "application layer data arrival" and "data link layer data arrival".

(2) Function Realization

The function is realized as follows: initialize relevant functions of this module and acquire relevant information required for running a process model; when all sub-modules in the data link layer are initialized, create a chain table to record information of all the sub-modules in the data link layer connected (including the number s of the sub-modules and an index of a packet stream), set m sub-modules in the data link layer as data link layer sub-modules of the three-layer structure, set one sub-module in the data link layer as a data link layer sub-module of the seven-layer structure, and set a destination address of the message sent by the three-layer structure as a broadcast address, wherein s=m+1.

Wait for the arrival of a message, and determine a source and transmission direction of a message received; if the message is transmitted from the application layer of the three-layer structure, send the message to the data link layer of the three-layer structure along the packet stream; or, if the message is transmitted from the data link layer of the three-layer structure, transmit the message to the application layer of the three-layer structure along the packet stream; and the message transmission process of the seven-layer structure is similar to the message transmission process of the three-layer structure, and explanation thereof is not repeated herein.

(3) Execution Logic

The execution logic is as follows: trigger a simulation start interrupt to enter the "init" state; when initialization is completed, enter the "wait" state; if a message from the application layer arrives, trigger a flow interrupt to enter the "application layer data arrival" state, and after that, directly return to the "wait" state to wait for the arrival of a next flow interrupt; if a message from the data link layer arrives, trigger a flow interrupt to enter the "data link layer data arrival" state, and after that, directly return to the "wait" state to wait from the arrival of a next flow interrupt.

Step 4: a presentation layer module, a session layer module, a transport layer module, a network layer module, a data link layer module and a physical layer module of the bay layer devices are constructed.

The presentation layer module, the session layer module, the transport layer module, the network layer module, the data link layer module and the physical layer module of the model of the seven-layer structure can be constructed through an existing common module construction method referring to a network communication OSI seven-layer model, and the data link layer module and the physical layer module of the model of the three-layer structure can be constructed through the same method. This embodiment has no limitation in module construction in other layers of the network structures.

Step 5: the modules are packaged into simulation elements, and external attributes are set.

Figure 2:
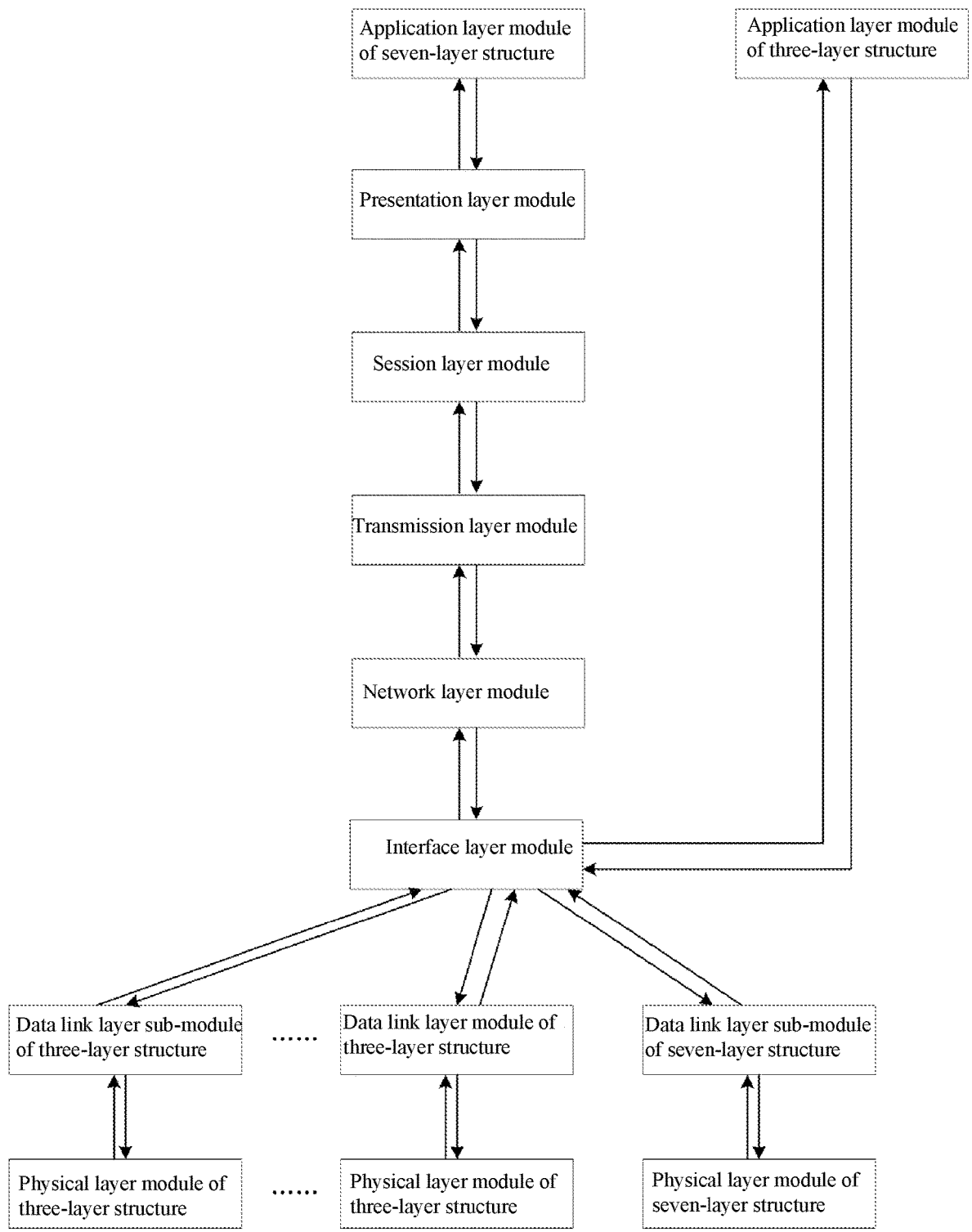
FIG. 2 is a diagram showing a principle of a node model for simulation of bay layer devices in one embodiment of the invention.

After the application layer module, the interface layer module, the presentation layer module, the session layer module, the transport layer module, the network layer module, the interface layer module, the data link layer module and the physical layer module are constructed, all the modules are connected by means of the packet stream, and messages are transmitted along the packet stream. As shown in FIG. 2, the modules are packaged into a user-defined simulation model of the bay layer devices, and users are allowed to control data reading and behaviors of the model by setting parameters.

From the above description, the construction process of the simulation model of the bay layer devices includes the functions of communication simulation elements of two network protocols, namely the three-layer structure and the seven-layer structure, so the simulation design method in this embodiment is not only suitable for simulation of bay layer devices, but also suitable for station control layer devices and process layer devices. The station control layer devices can be constructed solely by means of the model of the seven-layer structure, and the process layer devices can be constructed solely by means of the model of the three-layer structure.

Figure 3:
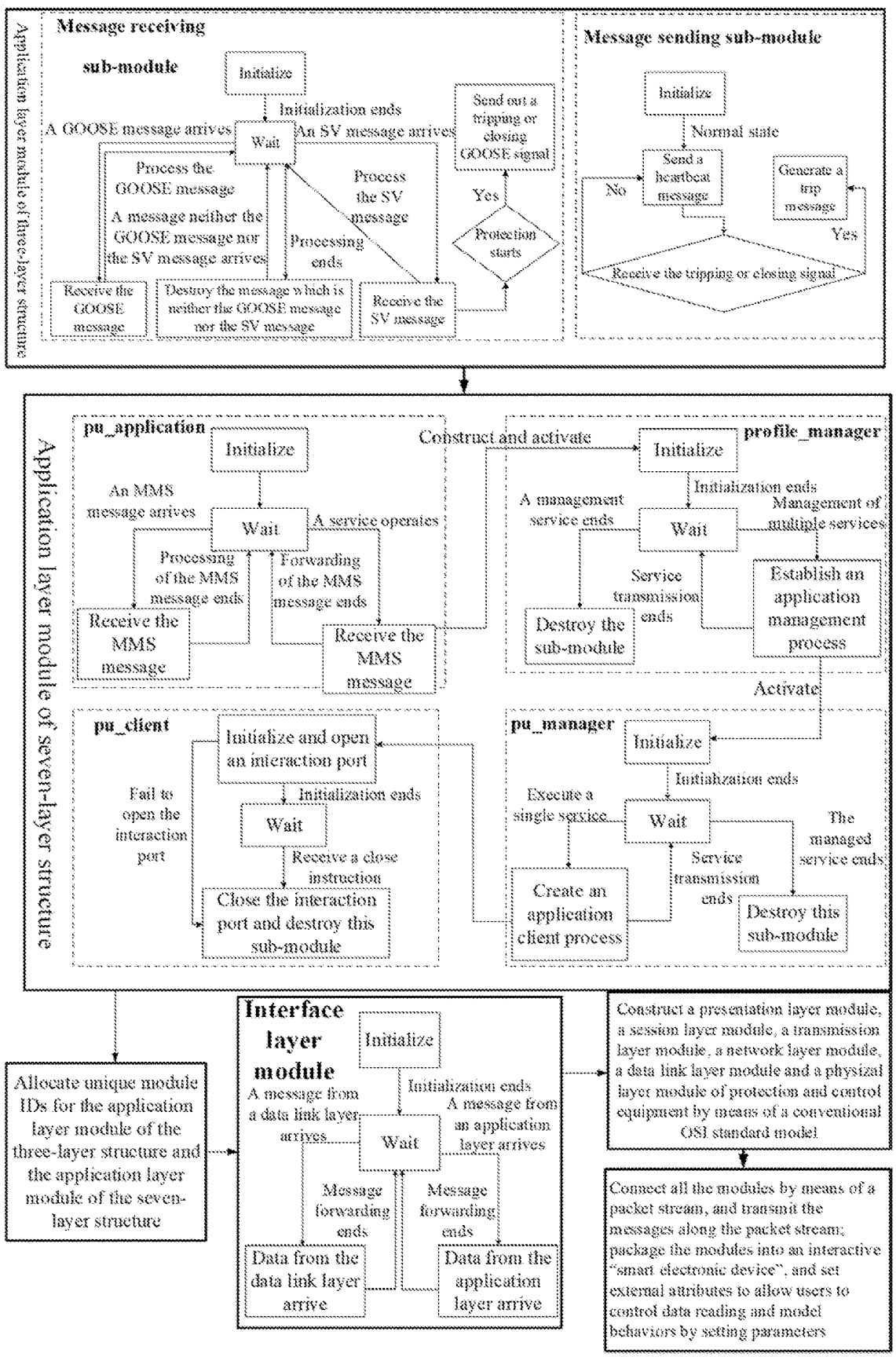
FIG. 3 is a flow chart for implementing a simulation design method of protection and control devices in another embodiment of the invention.

Referring to FIG. 3, another embodiment of the invention will be introduced below. With OPENT simulation software as a platform, a simulation design method for protection and control devices in bay layer devices of a smart substation of the invention is explained by means of specific examples. The simulation design method provided by the invention is not limited to the use of the OPENT simulation software, and can also be implemented using other communication network simulation platforms such as NS2 and MATLAB.

Unique module IDs have been set respectively for an application layer module of a seven-layer structure and an application layer module of a three-layer structure of the bay layer devices in constructing the application layer modules, which are used as identity tags of the modules. The ID of the application layer module of the seven-layer structure is stored in the application module of the three-layer structure, and the ID of the application layer module of the three-layer structure is stored in the application layer module of the seven-layer structure. The application layer module of the three-layer structure and the application layer module of the seven-layer structure grant access permissions to each other according to the module IDs of each other and can access and share data by means of the IDs of each other.

Step 1: an application layer module of a three-layer structure of the protection and control devices is constructed, wherein the application layer module comprises two sub-modules, one of which is sub-module pu_rec for receiving messages, and the other of which is sub-module pu_gen for sending messages.

The state and logic of the message receiving sub-module pu_rec to be realized during simulation are as follows:

(1) Set the "Init" State

Transition condition: simulation starts;

Function: initialize relevant functions of this module and acquire relevant information required for running a process model to make preparations for simulation;

(2) Set the "Idle" State

Transition condition: "init" state ends; "goose_process" state ends; "sv_process" state; "other_process" state ends;

Function: wait for the arrival of a message and determine the type of the message;

(3) Set the "goose_process" State

Transition condition: "idle" state ends, and a GOOSE message arrives;

Function: extract information from the GOOSE message, update breaker state information, and update statistics information of a receiving packet;

(4) Set the "sv_process" State

Transition condition: "idle" state ends, and an SV message arrives;

Function: extract electrical quantity information from the SV message, and update statistics information of messages received; process data according to an protection and control function algorithm adopted, and determine whether or not a tripping or closing GOOSE signal needs to be triggered;

(5) Set the "other_process" State

Transition condition: "idle" state ends, and a message, neither the SV message nor the GOOSE message, arrives;

Function: destroy the message which is neither the SV message nor the GOOSE message.

Figure 4:
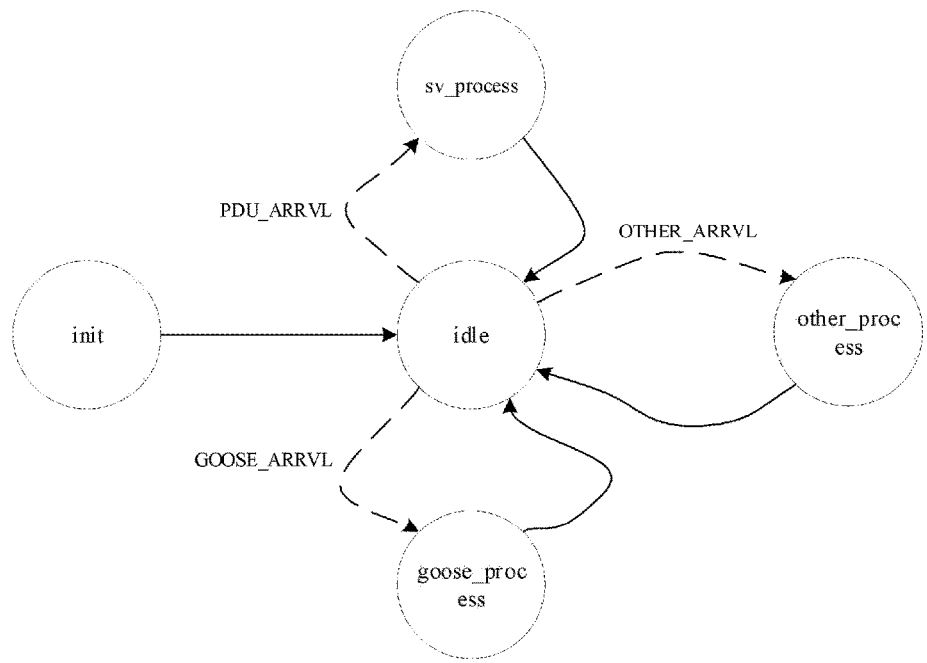
FIG. 4 is a schematic diagram of a process domain model of a message receiving sub-module of an application layer module of a three-layer structure of protection and control devices in another embodiment of the invention.

As shown in FIG. 4, the execution logic of the message receiving sub-module pu_rec is as follows: trigger a simulation start interrupt at the beginning of OPENT simulation to enter the "init" state; when the "init" state ends, directly enter the "idle" state; if a GOOSE message arrives (GOOSE_ARRVL), trigger a flow interrupt to enter the "goose_process" state, and when the "goose_process" state ends, directly return to the "idle" state to wait for the arrival of a next flow interrupt; if an SV message arrives (PDU_ARRVL), trigger a flow interrupt to enter the "sv_process" state, and when the "sv_process" state ends, directly return to the "idle" state to wait for the arrival of a next flow interrupt; if a message, neither the SV message nor the GOOSE message, arrives (OTHER_ARRVL), trigger a flow interrupt to enter the "other_process" state, and when the "other_process" state ends, directly return to the "idle" state to wait for the arrival of a next flow interrupt.

The state and logic of the message sending sub-module pu_gen to be realized during simulation are as follows:

(6) Set the "init" State

Transition condition: simulation starts;

Function: initialize relevant functions of this module and acquire relevant information required for running a process model to make preparations for simulation;

(7) Set the "heartbeat" State

Transition condition: "init" state ends; "heartbeat" state ends, and the time for sending a next heartbeat message arrives; "emergency" state ends, and the last trip message during variable-period transmission of a GOOSE message is sent;

Function: create a message according to a GOOSE message format, package a breaker no-trip signal into a corresponding field of the created message, output the message to the interface layer along a packet stream, calculate the sending time of a next packet according to a set GOOSE message heartbeat interval, and update statistics information of messages sent;

(8) Set the "emergency" State

Transition condition: "emergency" state ends, and the time for variable-period transmission of the next message arrives; "heartbeat" state ends, and "svp_rocess" state triggers a trip signal; "heartbeat" state ends, "arrival" state in the application layer module of the seven-layer structure is triggered, and the application layer module of the seven-layer structure is accessed according to the ID of the application layer module of the seven-layer structure to acquire required data information, which is then packaged into the GOOSE message to be sent to the lower layer module;

Function: create a message according to the GOOSE message format, package the breaker trip signal into the corresponding field of the created message, output the message to the interface layer along the packet stream, calculate the time for variable-period transmission of the next packet according to the set GOOSE message heartbeat interval, and update the statistics information of the messages sent.

Figure 5:
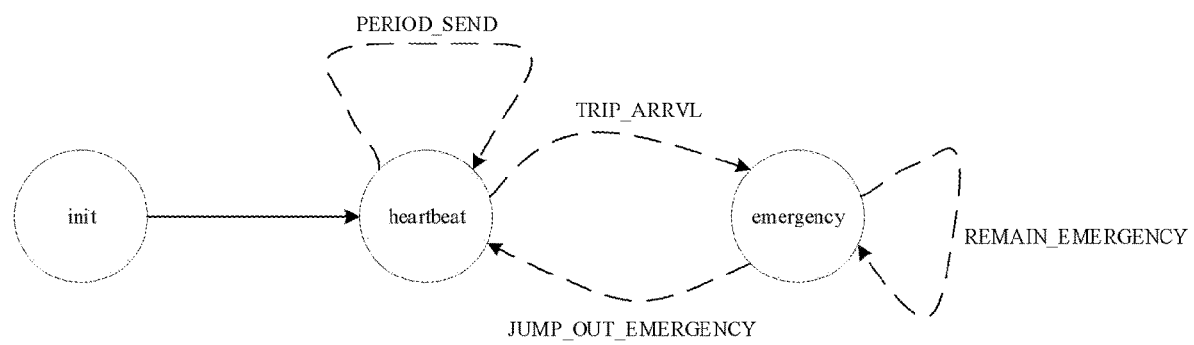
FIG. 5 is a schematic diagram of a process domain model of a message sending sub-module of an application layer module of a three-layer structure of protection and control devices in another embodiment of the invention.

As shown in FIG. 5, the execution logic of the message sending sub-module pu_gen is as follows: trigger a simulation start interrupt at the beginning of OPENT simulation to enter the "init" state; when the "init" state ends, set a self interrupt to enter the "heartbeat" state; when the "heartbeat" state ends, if the sending time of a next heartbeat message arrives (PERIOD_SEND), trigger the self interrupt to enter the "heartbeat" state again; if a trip signal is generated in the "sv_process" state of the module pu_rec or in the "arrival" state of the module pu_application in the application layer module of the seven-layer structure, trigger a remote interrupt to enter the "emergency" state; when the "emergency" state ends, if the time for variable-period transmission of a next trip message arrives (REMAIN_EMERGENCY), trigger the self interrupt again to enter the "emergency" state again; when variable-period transmission of the last trip message in the GOOSE message ends (JUMP_OUT_EMERGENCY), trigger the self interrupt to enter the "heartbeat" state.

Step 2: an application layer module of a seven-layer structure of the protection and control devices is constructed, wherein the application layer module comprises a root module pu_application and three sub-modules profile_manager, pu_manager and pu_client;

Regarding the protection and control devices, in case where periodic upload or burst upload (a protection action caused by tripping) enables an FTP service to run and an MMS message to be sent, the three sub-modules are triggered sequentially; in the root module pu_application, when the FTP service (such as a protection service) needs to be run and the MMS message needs to be sent, a self interrupt will be triggered to enter the "profile" state, and the sub-module profile_manager is triggered at first; and in the sub-module profile_manager, FTP services to be performed by the intelligent electronic devices are configured and integrated. In case where it is necessary to manage multiple services, the application management sub-module pu_manager will be started and used; and in the sub-module pu_manager, if the client behavior of a single service is to be simulated, the client sub-module pu_client will be started and used, and the application layer module of the three-layer structure is accessed to acquire required information.

The state and logic of the root module pu_application to be realized during simulation are as follows:

(1) Set the "Init' State

Transition condition: simulation starts; "init" state ends, and initialization of other relevant modules in the model has not been completed yet;

Function: wait for the completion of the initialization of other relevant modules in the model;

(2) Set the "start" State

Transition condition: "init" state ends;

Function: initialize relevant functions of this module and acquire relevant information for running a process model to make preparations for simulation;

(3) Set the "idle" State

Transition condition: "init" state ends; "profile" state ends; "arrival" state; "arrival" state ends;

Function: "idle" state, wait for the arrival of a next interrupt, and jump to a corresponding operating state according to an interrupt type and an interrupt code;

(4) Set the "profile" State

Transition condition: "idle" state ends, and a protection service is to be run;

Function: construct a service management sub-module profile_manager, and transmit relevant operating parameter data to the service management sub-module profile_manager;

(5) Set the "arrival" State

Figure 6:
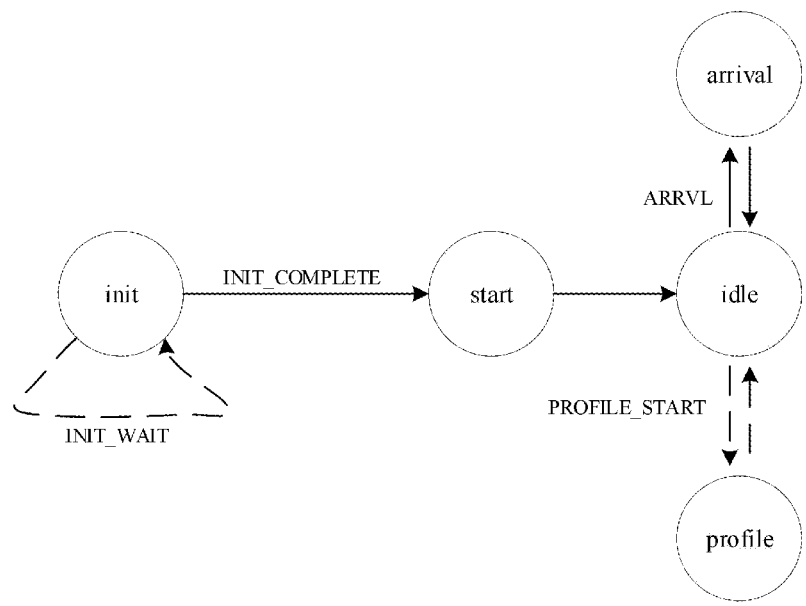
FIG. 6 is a schematic diagram of a process domain model of a root module of an application layer module of a seven-layer structure of protection and control devices in another embodiment of the invention.

Transition condition: "idle" state ends, and an MMS message arrives;

Function: extract and store relevant information from the MMS message, perform corresponding operation according to instruction information in the MMS message, and update statistics information of messages received;

As shown in FIG. 6, the execution logic of the root module pu_application is as follows: trigger a simulation start interrupt at the beginning of OPENT simulation to enter the "init" state, and jump in the "init" state to wait for the completion of the initialization of other modules of the model (INIT_WAIT); when the initialization of other modules is completed (INIT_COMPLETE), enter the "start" state to carry out self initialization; when the "start" state ends, enter the "idle" state; if the protection and control devices need to send an MMS message (PROFILE_START), trigger a self interrupt to enter the "profile" state, and when the "profile" state ends, directly return to the "idle" state to wait for the arrival of a next interrupt; if the MMS message arrives (arrival), trigger a flow interrupt to enter the "arrival" state, and when the "arrival" state ends, directly return to the "idle" state to wait for the arrival of a next interrupt.

The state and logic of the sub-module profile_manager to be realized during simulation are as follows:

(1) Set the "init" State

Transition condition: the module profile_manager is constructed and awakened;

Function: initialize relevant functions of this module and acquire relevant information required for running a process model to make preparations for simulation;

(2) Set the "idle" State

Transition condition: "init" state ends; "spawn" state ends;

Function: idle state, wait for the arrival of a next interrupt, and jump to a corresponding state according to an interrupt type and an interrupt code;

(3) Set the "spawn" State

Transition condition: "idle" state ends, and a protection application management process needs to be created;

Function: create the application management process pu_manager of the protection and control devices as required, and transmit operating parameter information to the application management process pu_manager;

(4) Set the "end" State

Transition condition: "idle" state ends, and a service managed by profile_manager has ended;

Function: destroy the process profile_manager and release all memory.

Figure 7:
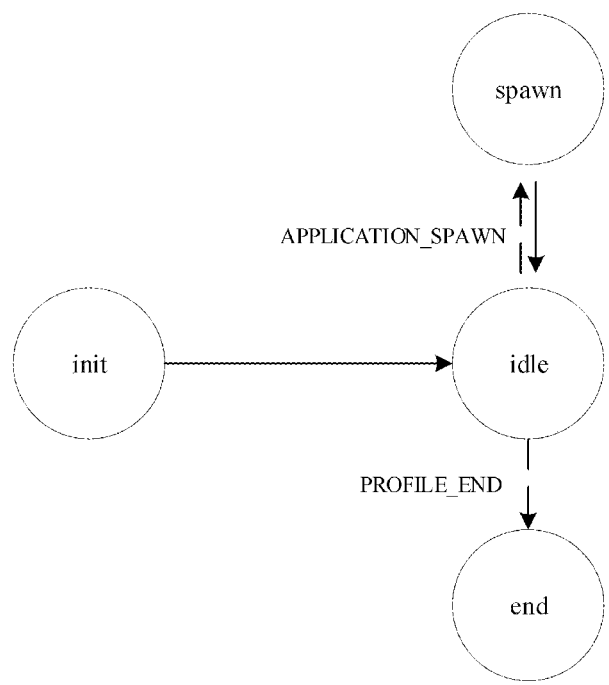
FIG. 7 is a schematic diagram of a process domain model of a sub-module profile_manager of an application layer module of a seven-layer structure of protection and control devices in another embodiment of the invention.

As shown in FIG. 7, the execution logic of the sub-module profile_manager is as follows: when profile_manager is created and awakened, enter the "init" state to carry out self initialization; when the "init" state ends, enter the "idle" state; if the protection application management process (APPLICATION_SPAWN) needs to be created, trigger a self interrupt to enter the "spawn" state; when the "spawn" state ends, directly return to the "idle" state to wait for the arrival of a next interrupt; and when the service managed by profile_manager has already ended (PROFILE_END), trigger the self interrupt to enter the "end" state.

The state and logic of the sub-module pu_manager to be realized during simulation are as follows:

(1) Set the "init" State

Transition condition: the module pu_manager is constructed and awakened;

Function: to initialize relevant function of this module and acquire relevant information required for running a process model to make preparations for simulation;

(2) Set the "idle" State

Transition condition: "init" state ends; "spawn" state ends;

Function: idle state, wait for the arrival of a next interrupt, and jump to a corresponding state according to an interrupt type and an interrupt code;

(3) Set the "spawn" State

Transition condition: "idle" state ends, and a protection application client process needs to be created;

Function: establish and awaken the application client process pu_client as required, and transmit relevant operating information to the application client process pu_client;

(4) Set the "end" State

Transition condition: "idle" state ends, and a protection application service managed by pu_manager has ended;

Function: destroy the process pu_manager and release all memory.

Figure 8:
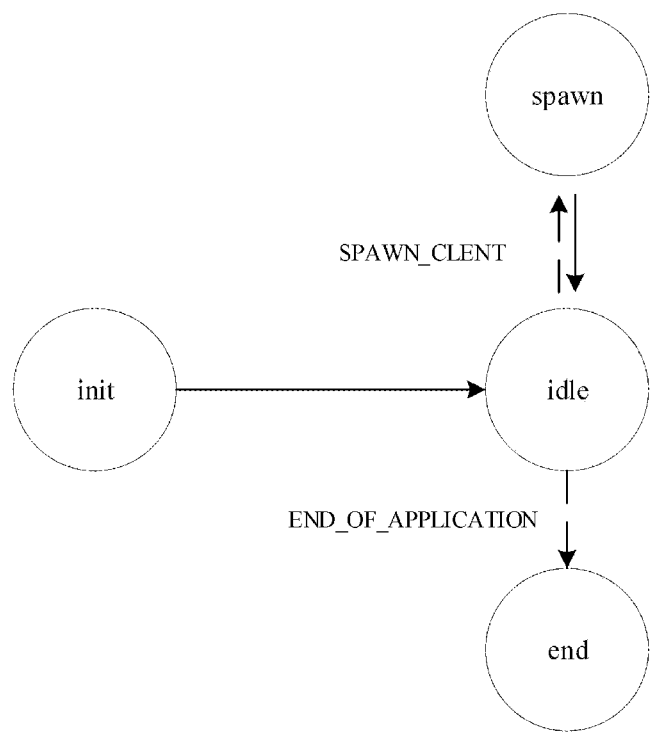
FIG. 8 is a schematic diagram of a process domain model of a sub-module pu_manager of an application layer module of a seven-layer structure of protection and control devices in another embodiment of the invention.

As shown in FIG. 8, the execution logic of the sub-module pu_manager is as follows: when pu_manager is established and awakened, enter the "init" state to carry out self initialization; when the "init" state ends, enter the "idle" state; if the protection application client process (SPAWN_CLIENT) needs to be created, trigger a self interrupt to enter the "spawn" state; when the "spawn" state ends, directly jump to the "idle state" to wait for the arrival of a next interrupt; when the application managed by pu_manager has ended, trigger the self interrupt to enter the "end" state.

The state and logic of the sub-module pu_client to be realized during simulation are as follows:

(1) Set the "open" State

Transition condition: the module pu_client is constructed and awakened;

Function: initialize relevant functions of this module, and open a connection with the lower layer module; access the application layer module of the three-layer structure according to the ID of the application layer module of the three-layer structure, and acquire required data information; package the data information into an MMS message, and send the MMS message to the lower layer module;

(2) Set the "wait" State

Transition condition: "open" state ends, and the connection with the lower layer module is opened; "wait" state ends, and close instruction message segments from the lower layer are not all received;

Function: receive and assemble a close instruction message from the lower layer;

(3) Set the "close" State

Transition condition: "open" state ends, and the connection with the next layer module fails to be opened; "wait" state ends, and a close instruction from the lower layer module is received;

Function: close the connection with the lower layer module, destroy the process pu_client, and release all memory.

Figure 9:
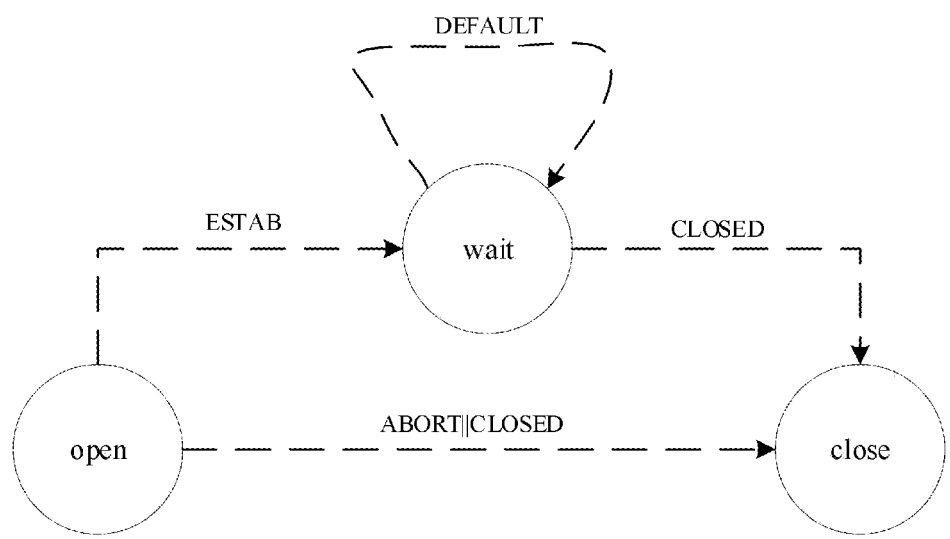
FIG. 9 is a schematic diagram of a process domain model of a sub-module pu_client of an application layer module of a seven-layer structure of protection and control devices in another embodiment of the invention.

As shown in FIG. 9, the execution logic of the sub-module pu_client is as follows: when pu_client is constructed and awakened, enter the "open" state; when the connection with the next layer module is opened (ESTAB), end the "open" state, and enter the "wait" state"; if the "wait state" ends and the close instruction message segments from the next layer are not all received, return to the "wait" state again to wait for the close instruction message segments; if the "wait state" ends and the close instruction message segments from the next layer are all received (CLOSED), enter the "close" state; and when connection with the next layer module fails to be opened (ABORT||CLOSED), end the "open" state and enter the "close state".

Step 3: an interface layer module pu_intf of the bay layer of the protection and control devices is constructed, and the state and logic of the interface layer module pu_intf to be realized during simulation are as follows:

(1) Set the "init" State

Transition condition: simulation starts;

Function: initialize relevant functions of this module at the beginning of simulation and acquire relevant information required for running a process model to make preparations for simulation;

(2) Set the "init2" State

Transition condition: "init" state ends;

Function: wait for the completion of initialization of all sub-modules in the data link layer;

(3) Set the "wait" State

Transition condition: "init2" state ends;

Function: create a chain table to record information of all the sub-modules in the data link layer connected (including the quantity and an index of a packet stream);

(4) Set the "idle" state

Transition condition: "wait" state ends; "app layer arrival" state ends; "mac layer arrival" state ends;

Function: wait for the arrival of a message, and determining the source of a message received;

(5) Set the "app layer arrival" State

Transition condition: "idle" state ends, and a message from the application layer module of the three-layer structure or from the application layer module of the seven-layer structure arrives;

Function: if the message from the three-layer structure arrives, set a destination address of the message as a broadcast address, and send the message to all data link layer sub-modules corresponding to the three-layer structure along the packet stream; if the message from the seven-layer structure arrives, send the message to the data link layer sub-module corresponding to the seven-layer structure;

(6) Set the "mac layer arrival" State

Transition condition: "idle" state ends, and a message from the data link layer arrives;

Function: if the message from the data link layer corresponding to the three-layer structure arrives, send message to the application layer module of the three-layer structure along the packet stream; if the message from the data link layer corresponding to the seven-layer structure arrives, send the message to the application layer module of the seven-layer structure.

Figure 10:
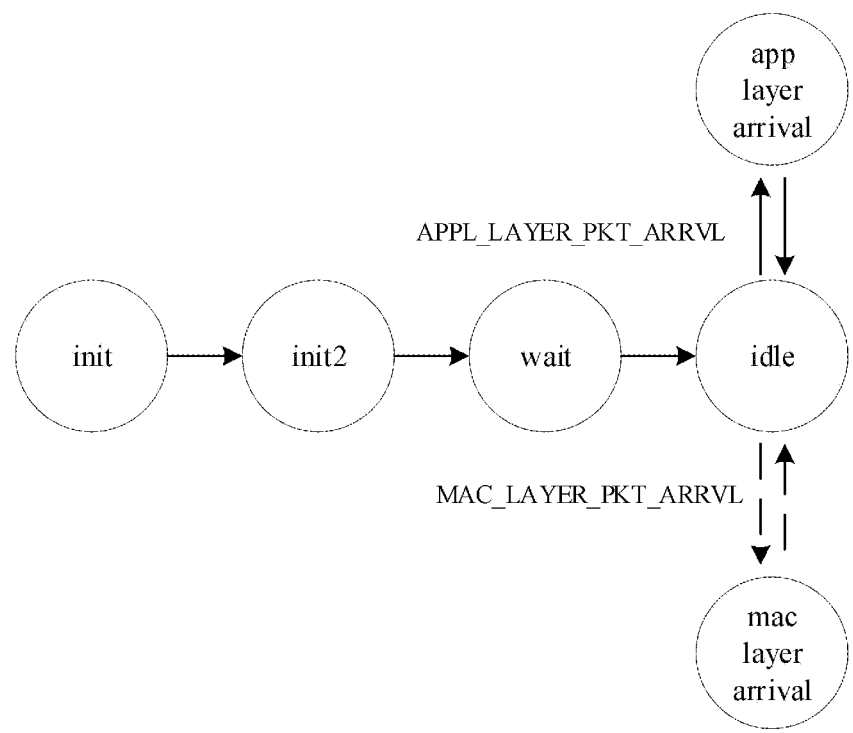
FIG. 10 is a schematic diagram of a process domain model of an interface layer module of protection and control devices in another embodiment of the invention.

As shown in FIG. 10, the execution logic of the interface layer module pu_intf is as follows: trigger a simulation start interrupt at the beginning of OPENT simulation to enter the "init" state; when "init" state ends, set a self interrupt to enter the "init2" state; when "init2" state ends, set a self interrupt to enter the "wait" state; when "wait" state ends, set a self interrupt to enter the "idle" state; if a data packet from an upper layer arrives (APPL_LAYER_PKT_ARRVL), trigger a flow interrupt to enter the "app layer arrival" state, and when the "app layer arrival" state ends, directly return to the "idle" state to wait for the arrival of a next flow interrupt; if a data packet from the lower layer arrives (MAC_LAYER_PKT_ARRVL), trigger a flow interrupt to enter the "mac layer arrival" state, and when the "mac layer arrival" state ends, directly return to the "idle" state to wait for the arrival of a next flow interrupt.

Step 4: a presentation layer module, a session layer module, a transport layer module, a network layer module, a data link layer module and a physical layer module of the protection and control devices are constructed.

OPENT includes models meeting the OSI standard, wherein the function of one layer may be realized by multiple sub-modules, and a single module may realize the functions of multiple layers.

Step 5: the constructed modules are embedded into a conventional OSI standard model to allow data packets to be transmitted along the packet stream. After the model is constructed, user-defined external attributes including relevant attributes of the seven-layer structure, relevant attributes of a protection algorithm and relevant attributes of the three-layer structure are set for the model to allow users to control data reading and the behaviors of the model by setting parameters.

In this embodiment, node models of the protection and control devices are established on the OPENT platform, so that the protection and control devices can process MMS messages, SV messages and GOOSE messages simultaneously in the simulation process, and data of the two network structures can be exchanged and shared; and an interface layer is additionally configured between the application layer and the data link layer to allow data to be directly mapped to the data link layer from the application layer, so that received and sent messages contain actual electrical quantity information.

The above embodiments are merely used to explain the technical solutions of the invention, and are not intended to limit the invention. Although the invention has been explained in detail with reference to the above embodiments, those skilled in the art would appreciate that the technical solutions recorded in the aforesaid embodiments can be modified, or parts of the technical features in the aforesaid embodiments can be equivalently substituted. All these modifications or substitutions can be done without departing from the spirit and scope of the technical solutions of the embodiments of the invention.

What is claimed is:

1. A simulation design method for bay layer devices of a smart substation, comprising:

configuring application layer modules of a first network structure and an application layer module of a second network structure, and allocating an unique identity tag for each of the application layer modules, wherein the identity tag of the application layer module of the second network structure is stored in the application layer modules of the first network structure, and the identity tags of the application layer modules of the first network structure are stored in the application module layer of the second network structure, the application layer module of the second network structure and the application layer modules of the first network structure grant access permissions to each other according to the reciprocal module identity tags;

configuring a presentation layer module, a session layer module, a transport layer module, a network layer module, a data link layer module and a physical layer module, the application layer modules of the first network structure, the data link layer module and the physical layer module being connected by means of a first packet stream and forming the first network structure, the application layer module of the second network structure, the presentation layer module, the session layer module, the transport layer module, the network layer module, the data link layer module and the physical layer module being connected by means of a second packet stream and forming the second network structure;

configuring s sub-modules for the data link layer, constructing an interface layer module between the application layer modules of the first network structure and the sub-modules of the data link layer, the interface layer module also connected between the network layer module of the second network structure and the sub-modules of the data link layer, and setting, by the interface layer module, network structures to which the sub-modules of the data link layer belong, one sub-module of the data link layer belonging to the second network structure, and other sub-modules of the data link layer belonging to the first network structure, the interface layer module allowing data to be directly mapped to the data link layer of from the application layer; and setting a plurality of states and execution logics of all modules of the first network structure and the second network structure respectively, and packaging all the modules into simulation elements according to transmission directions of data in the network structures, the data of the first network structure and the second network structure can be exchanged and shared, if an instruction in an MMS message from a station control layer of the smart substation needs to be transmitted to a process layer, the application layer module of the first network structure will be accessed according to the identity tag of the second network structure to acquire required data information, which is then packaged into the GOOSE (Generic Object-Oriented Substation Event) message to be sent to the interface layer, so the bay layer devices can processing MMS (manufacturing message specification) message, SV (sampled value) messages and GOOSE messages simultaneously.

2. The simulation design method for bay layer devices of a smart substation according to claim 1, wherein configuring the application layer modules of the first network structure comprises: configuring a message receiving sub-module and a message sending sub-module, the function of the application layer module of the first network structure comprising receiving and analyzing the SV message or the GOOSE message from process layer devices to obtain electrical quantity data or electrical on-off data therefrom; creating a GOOSE heartbeat message or a GOOSE switching message according to the electrical on-off data, sending the message to the interface layer, and updating statistics information of data received and sent.

3. The simulation design method for bay layer devices of a smart substation according to claim 2, wherein when a GOOSE message is transmitted, the execution logic of the message sending sub-module of the first network structure includes:
 when a power system is in a steady state, packaging a no-trip signal into a GOOSE heartbeat message in terms of an IEC61850 protocol standard, and sending the GOOSE heartbeat message to the interface layer module; and
 when the message receiving sub-module triggers a trip signal, packaging the trip signal into the GOOSE message in terms of the IEC61850 protocol standard, sending the GOOSE message to the interface layer module, and determining a sending time of a next GOOSE message according to a GOOSE message retransmission rule.

4. The simulation design method for bay layer devices of a smart substation according to claim 2, wherein when a message arrives in the application layer module of the second network structure, the execution logic of the message sending sub-module of the first network structure further includes:
 accessing the application layer module of the second network structure according to the identity tag of the application layer module of the second network structure to acquire required data, packaging the required data into a GOOSE message, and transmitting the GOOSE message to the interface layer module.

5. The simulation design method for bay layer devices of a smart substation according to claim 2, wherein the execution logic of the message receiving sub-module of the first network structure includes:
 receiving and analyzing an SV message and/or a GOOSE message, and updating statistics information of messages received and sent; and
 if a message received is neither the SV message nor the GOOSE message, destroying the message.

6. The simulation design method for bay layer devices of a smart substation according to claim 1, wherein configuring the application layer module of the second network structure comprises configuring a root module and a plurality of execution sub-modules, wherein the execution sub-modules are used to transmit messages, the function of the application layer modules of the second network structure comprising receiving and analyzing an MMS message from station control layer devices to obtain data contents therefrom; acquiring an operation instruction of an external power system and/or extracting operation data from the application layer module of the first network structure to generate the MMS message in terms of the IEC61850 (International Electrotechnical Commission) protocol standard.

7. The simulation design method for bay layer devices of a smart substation according to claim 6, wherein when a message to be sent by bay layer devices belongs to the second network structure, the root module is triggered to construct the plurality of execution sub-modules, and the execution sub-modules access the application layer modules of the first network structure according to the identity tag of the application layer modules of the first network structure to acquire required data, which are then packaged into a message to be sent to the interface layer module.

8. The simulation design method for bay layer devices of a smart substation according to claim 1, wherein setting, by the interface layer module, the network structures to which the sub-modules of the data link layer belong, comprises:
 creating, after the s sub-modules of the data link layer are initialized, a chain table to record information of all the sub-modules, setting m of the sub-modules as data link layer sub-modules of the first network structure, and setting one of the sub-modules as a data link layer sub-module of the second network structure, wherein s=m+1, the variables "m" and "s" are integers.

9. The simulation design method for bay layer devices of a smart substation according to claim 1, wherein the execution logic of the interface layer module includes:
 determining a network structure source of a message according to the identity tag of the application layer module in the message, determining transmission direction of the message, and sending the message to through the data link layer sub-module of the corresponding network structures;
 if the message transmitted from the application layer of the second network structure, sending the message to the data link layer of the second network structure along the second packet stream; or, if the message transmitted from the data link layer of the second network structure, transmitting the message to the application layer of the second network structure along the second packet stream;
 if the message transmitted from the application layer of the first network structure, sending the message to the data link layer of the first network structure along the first packet stream; or, if the message transmitted from the data link layer of the first network structure, transmitting the message to the application layer of the first network structure along the first packet stream.

10. The simulation design method for bay layer devices of a smart substation according to claim 1, wherein the execution logic of the interface layer module further includes:
 determining a network structure source of a message according to an MAC address in the message, determining transmission direction of the message, and sending the message to through the application layer module of the corresponding network structure;
 if the message transmitted from the application layer of the second network structure, sending the message to the data link layer of the second network structure along the second packet stream; or, if the message transmitted from the data link layer of the second network structure, transmitting the message to the application layer of the second network structure along the second packet stream;

if the message transmitted from the application layer of the first network structure, sending the message to the data link layer of the first network structure along the first packet stream; or, if the message transmitted from the data link layer of the first network structure, transmitting the message to the application layer of the first network structure along the first packet stream.

* * * * *